Nov. 5, 1957  A. M. THOMPSON  2,811,840
FILTERED DUCT IN REFRIGERATOR
Original Filed Feb. 9, 1952  2 Sheets-Sheet 1
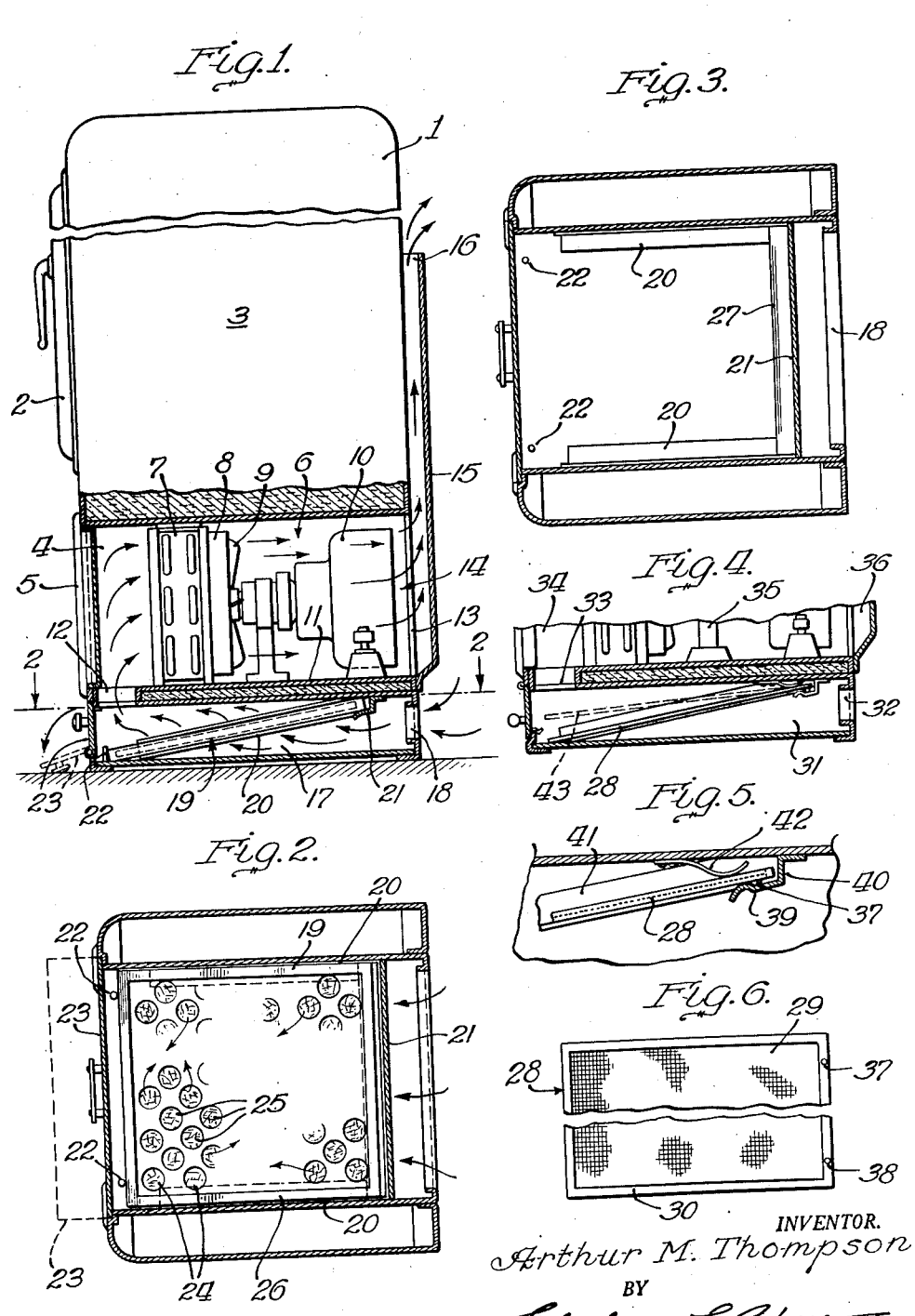
INVENTOR.
Arthur M. Thompson
BY
Eberhard E. Wellly
Atty.

Nov. 5, 1957 A. M. THOMPSON 2,811,840
FILTERED DUCT IN REFRIGERATOR
Original Filed Feb. 9, 1952 2 Sheets-Sheet 2
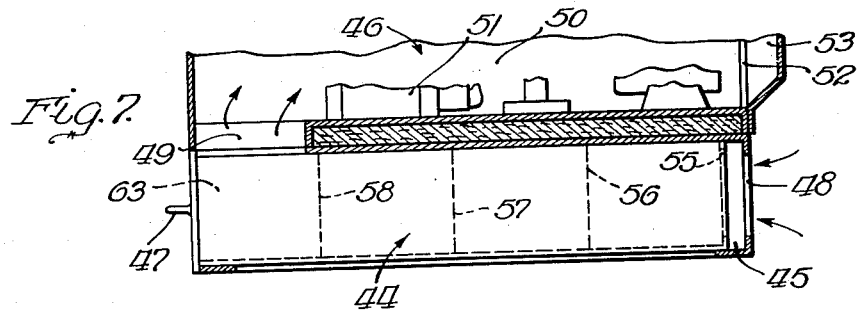
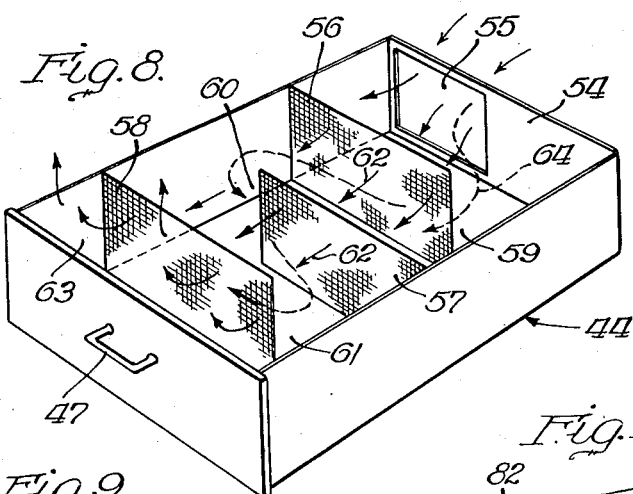
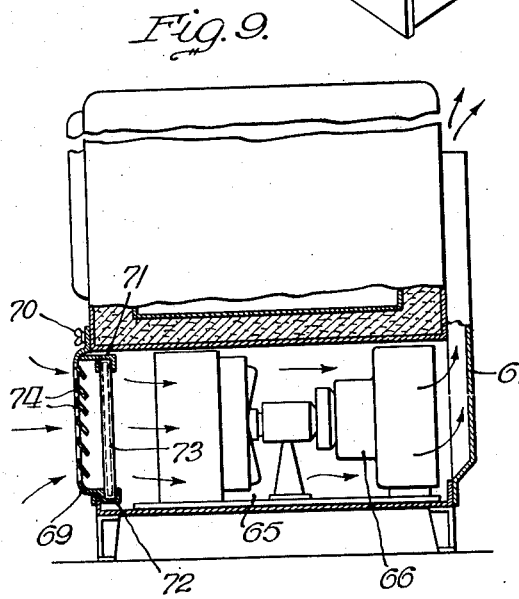
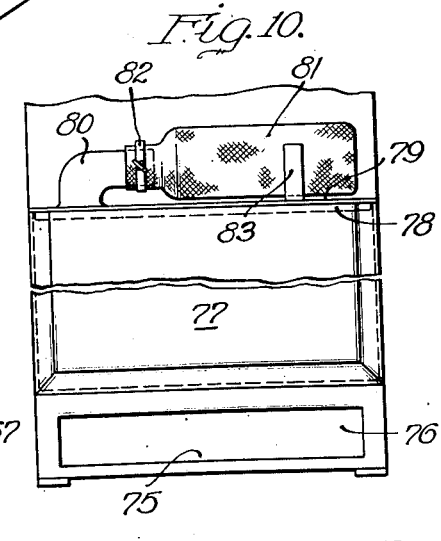
INVENTOR.
Arthur M. Thompson
BY
Eberhard E. Whalley
Atty.

United States Patent Office 2,811,840
Patented Nov. 5, 1957

2,811,840
FILTERED DUCT IN REFRIGERATOR
Arthur M. Thompson, Chicago, Ill.

Original application February 9, 1952, Serial No. 270,794, now Patent No. 2,702,459, dated February 22, 1955. Divided and this application April 1, 1954, Serial No. 420,257

9 Claims. (Cl. 62—117.4)

This invention relates to filters generally adapted for use in air flow conduits or air carrying chambers in general. More specifically, this application comprises a divisional application of my copending application, Serial No. 270,794, filed February 9, 1952, and relating to Filters For Air Cooling Systems Of Refrigerators which has since issued on February 22, 1955 as Patent No. 2,702,459.

The filter means of the present invention may be used in any air conducting means and is more specifically herein shown and described as relating to a refrigerator having a filtrating system wherein air is drawn in from a surrounding source for cooling the refrigerating mechanisms and wherein such air is dispelled into the ambient atmosphere after it leaves such mechanisms. More specifically, the filter means of the present invention is incorporated into the air flow system comprising a part of a refrigerator and wherein the refrigerating mechanisms are bottom-mounted and where it is quite essential that most of the heat developed by these mechanisms shall be carried off and dissipated to draw such heat away from the bottom portion of the normal refrigerator food compartment to prevent heat transmission to said compartment.

One of the main objects of the present invention, therefore, is to provide a filter in the air passageway or system which is incorporated for cooling the refrigerating mechanisms of refrigerators in general.

Another object of the present invention is to provide a filter of this character which may be easily removed for cleaning or for replacement.

Another object of the present invention is to provide a filter of this type which filter is arranged pivotally as an enlarged flap member and wherein the suction created by the blower system will be able to draw air past the filter in the event that such filter becomes completely clogged and impervious to the passage of air.

A still further object of the present invention is to provide a drawer form of filter arrangement which may be withdrawn from the air passageway or air channel through the cooling system of the refrigerator for cleaning. The same drawer arrangement also includes the provision of means to bypass the air in the event that the filter arrangement therein shall become overloaded with lint and dirt when in use for too great a time without cleaning.

Another object of the present invention is to provide a filter means at the air inlet portion of a refrigerator to thoroughly clean the air before the same passes through the refrigerator mechanisms for cooling the latter and for subsequent dissipation into the atmosphere of the surrounding room.

Another object of the present invention is to provide a filter means at the exit end of the air system which cools the refrigerator mechanisms.

Other objects and advantages relating to the filter means and the various modified constructions thereof shall hereinafter appear in the following detailed description having reference to the accompanying drawings forming a part of this specification.

In the drawings:

Figure 1 is a side elevational view of a conventional type of refrigerator with portions thereof broken away and in section to better illustrate the embodiment of the filter arrangement of the present invention into such a refrigerator;

Figure 2 is a plan sectional view taken substantially along the line 2—2 in Figure 1 to further illustrate details of construction of the filter arrangement;

Figure 3 is another plan sectional view identical to that illustrated in Figure 2 but with the filter unit removed therefrom;

Figure 4 is a fragmentary cross sectional view of the bottom portion of a refrigerator corresponding to that illustrated in Figure 1, but showing a modified arrangement of filter and support therefor;

Figure 5 is a detail view of a portion of the filter arrangement illustrated in Figure 4;

Figure 6 is a bottom view of the filter used in Figures 4 and 5;

Figure 7 is another side elevational view of a conventional refrigerator and of the bottom portion thereof illustrated in section to show another modified arrangement of filter which is in the form of a drawer;

Figure 8 is a perspective view of the other form of filter illustrated in Figure 7;

Figure 9 is another side elevational view of a conventional type of refrigerator to illustrate a further embodiment of the filter mechanism in a different type of air cooling system; and Figure 10 is a fragmentary rear view of a refrigerator illustrating a still further use of a filter in connection with the air cooling system for the refrigerating mechanisms.

Referring to Figure 1, a conventional form of refrigerator cabinet 1 is here illustrated having the usual food compartment door 2 at the front thereof for access to the food compartment portion of the cabinet 3, this refrigerator including a bottom-mounted air cooled compartment 4 which is accessible through a removable door 5 and which houses in general the refrigerating mechanisms 6. These mechanisms include generally a condenser 7, a blower housing 8 with a fan 9 that are suitably supported and connected with a refrigerating machine 10 with all of these various associated mechanisms being mounted upon a base or floor 11 of the compartment 4. The forward portion of the floor 11 has a transverse opening 12 therethrough and the rear wall 13 of the compartment includes an opening 14 which communicates with the interior of a false back 15 that provides an upwardly extending chimney unit for conducting air from the compartment 4 upwardly and outwardly through the open end of the false back as illustrated at 16.

This class or type of refrigerator includes a bottom chamber 17 which has a rear inlet opening 18 for supplying air from the space surrounding the refrigerator through the chamber 17 and upwardly through opening 12 in floor 11 into the refrigerating mechanism compartment 4, through which such air is subsequently discharged upwardly through the false back 15 and out of the opening 16 thereof.

In normal conditions of use, considerable dirt and lint and other quantities of foreign matter are carried by the air stream into the opening 18 through the chamber 17 and opening 12 into the compartment 4. Because of this circulation of air and the carrying of foreign materials through the refrigerator as explained, most of this dust and dirt is again expelled in an upper elevation through the opening 16 in the false back 15 where it is carried upwardly due to the additional heating of the air in contrast to its inlet temperature at the inlet 18. Such dust and dirt laden air will, therefore, have a tendency to spread into the room to be dissipated and carried to food or other places in a kitchen where such refrigerator is normally located. Such dust and dirt will also settle on the walls and other units that might be mounted above such refrigerator, eventually reducing redecorating or cleaning which is an obvious result of this type of air cooling system for a refrigerator.

Not only does the dust and dirt pass through the unit as explained, but a number of the parts of the refrigerating mechanisms may be covered with oil film as a natural result of the lubrication of such mechanisms, and dust, dirt and lint will settle upon these mechanisms, eventually insulating the same to a great extent to prevent highly efficient air cooling of the air which passes through the compartment 4 in the refrigerator. In many cases, the inlet air which enters through the opening 18 may also carry a certain amount of oil or grease in finely divided form which will also settle upon the various mechanisms in the compartment 4 and over a period of time such covered parts will also gather a great deal of the foreign materials from the air passing through the cooling system.

To eliminate the aforementioned objectionable characteristics of a free air stream passing through the air cooling system of a refrigerator, the present invention contemplates the use of a filter 19 disposed diagonally across the chamber 17 as supported by a pair of angle brackets such as 20 carried by the opposite sides of the chamber 17 with the end of the filter being carried in a transverse bracket 21 with the lower forward end of the filter 19 disposed in back of one or more pins such as 22. The chamber 17 is provided with a door 23 which provides an access opening for removal of the filter 19 to clean the latter or to replace the same.

This filter 19 is of a commercial type and which may be made of a thickness and size to adequately filter all dirt and dust out of the air which passes through the chamber 17 and into the compartment 4 of the refrigerator. As seen in Figure 2, the filter 19 comprises a composite unit having a plurality of openings such as 24 forming the outer layers of the filter and between which spun glass or other filter material may be maintained to withhold all of the dust and dirt passing through the filter unit. This entire structure is mounted in a frame 26 and as a unit, is generally the type which is used for filtrating air passing through heating units in the home. To replace such a filter or to clean the same, it is merely necessary to open the door 23 and to reach in and lift the filter over the pins 22 and to draw the same endwise of the compartment 17. The filter is readily replaced by inserting the end through the opening closed by door 23 and letting the inner end slide up along the angle brackets 20 until the rear end engages the bracket 21 letting the filter drop in back of the pins 22. By angling the filter as illustrated in Figure 1, it is possible to create a larger filter area and to maintain the most efficient air passage volume for a considerable length of time and use of such filter. Periodic inspection will disclose the need for cleaning and replacement.

As seen in Figure 3, the bracket arrangement used for supporting the filter is simple in construction and it should be noted that the rear angle bracket 21 is preferably curved or sloped downwardly at the front edge 27 thereof to better receive the inner end of the filter when the same is placed into operative filtering position within the chamber 17.

In Figures 4, 5 and 6, the modified construction herein disclosed, illustrates a filter 28 which may be of plastic or cloth screening such as 29 carried within a lightweight frame 30. This screen 28 is carried within the compartment 31 having an air inlet 32 at the rear portion thereof with an air discharge opening at 33 through which air enters the chamber 34 carrying the refrigerating mechanisms 35 to be subsequently discharged through the false duct 36 to atmosphere.

With this arrangement, the filter or screen 28 includes a pair of pins or fulcrums 37 and 38 along one edge of the frame 30 which are arranged for seating upon the leg 39 of the rear bracket 40. Side guides or angle brackets 41 are here used as in the preferred form to guide the screen into the position best illustrated in Figures 4 and 5. In addition, this construction also contemplates the use of one or more lightweight leaf springs 42 which will hold the inner end of the filter 28 downwardly to bring the pins 37 and 38 into contact with the bracket 40, thus pivotally supporting the filter framework at this point.

With this particular arrangement of filter, the entire unit is supported for pivoting upwardly into the dotted line position indicated at 43 in Figure 4 or into any similar position as the case may be. With this particular screen, it is possible to lift the entire unit in the event that such screen becomes clogged to the extent that it is impervious to air. The screen then becomes a flap type valve functioning under the suction of the blower or fan unit of the refrigerating mechanisms so that with this screen it is impossible to cut off the air supply for cooling such mechanisms. Furthermore, the flapping of the screen under these extreme conditions should eventually warn or indicate to the person using the refrigerator that the screen is in need of replacement, thus providing an audible signal to that effect.

The modified arrangement of refrigerator illustrated in Figures 7 and 8 contemplates the use of a more rigid and expensive filter unit in the form of a drawer 44. The drawer 44 is arranged for placement into the bottom chamber 45 of the refrigerator 46 and is provided with a handle 47 to remove the drawer and to replace the same. Chamber 45 is provided with an air inlet opening at 48 and with an air outlet opening at 49 which permits the air to flow into the chamber 50 which houses the refrigerator mechanisms 51. From the latter chamber, the air is discharged through the opening 52 and into the vertical exit duct 53. As seen in Figure 8, the back wall 54 of the drawer 44 includes an inlet opening 55 through which the air that enters the opening 48 may pass into the drawer. A plurality of screens or filters 56, 57 and 58 are carried in the drawer 44 extending the full height thereof but staggered crosswise to provide end openings such as 59, 60 and 61 staggered in the lengthwise direction of such drawer.

Therefore, with this arrangement and with the screens clean, the air entering the opening 55 will pass directly and straight through the screens as shown by the arrows 62 to pass upwardly out of the last compartment 63 of the drawer and through the opening 49 into the compartment 50. When the screens 56, 57 and 58 become too covered with dirt and lint and other foreign matter the air may then begin to bypass in the direction of the dotted arrows 64 about the screens and through the end openings 59, 60 and 61 to eventually pass out of the drawer and into the opening 49 in the refrigerator shown in Figure 7.

Obviously, under normal conditions of use, a refrigerator of this type can be maintained for operation with clean air for a great period of time. Furthermore, certain intervals of inspection will show whether or not the screens in the drawer 44 require cleaning, and under normal conditions of use such screens or filters will bypass the air directly therethrough for entry into the compartment 50. It is only under extreme conditions of operation that the air must take the tortuous path about the ends of the screens to enter such chamber 50 and thus provides a safety means to continue the efficient cooling of the refrigerator mechanisms upon continual oversight on the part of the user to maintain the screens or filters in clean condition. Figure 8 only illustrates the use of three staggered screens, and obviously this number may be increased according to the desired conditions of operation which may require more or less numbers of screens.

In Figure 9 a refrigerator is illustrated with a lower compartment 65 housing the refrigerator mechanisms 66 with the compartment opening into a false back 67 to discharge air out of the upper end of the false back 67 and into the atmosphere. This particular compartment 65 is arranged to receive cool air from the ambient atmosphere through a louvered door 69 which is readily removable by any suitable means such as one or more thumb nuts 70. This door 69 includes upper and lower channels 71 and 72 for retaining a filter 73 therebetween and in place across the channel opening of the air that passes through the door 69 and through the louvers 74 therein. With this particular arrangement, therefore, the air all enters through the door which is here shown in the forward part of the refrigerator to pass over the refrigerating mechanisms 66 and out through the rear false back 67 in the normal manner.

Figure 10 illustrates the use of a refrigerator having a filter associated with the discharge portion of the false back thereof. As seen in Figure 10, the refrigerator includes a rear opening 75 which enters in to a lower compartment 76 for passage through the usual opening into the compartment housing the refrigerator mechanisms. This air is then discharged through the rear wall of the refrigerator for passage into the false back 77 and upwardly therein toward the discharge end 78 thereof. In this construction, the open end 78 of the false back 77 is closed with a suitable cover 79 having a discharge duct 80 therein which diverts all of the air coming from the interior of the refrigerating mechanisms compartment into a bag 81 for discharge therethrough. This bag 81 is of a class and character substantially of the type as used in vacuum cleaners or similar units, and functions to filter all of the dirt, dust and foreign matter out of the air before it passes into the atmosphere. This bag 81 may be removably carried as at 82 to be connected or disconnected from the duct 80 and a suitable bracket carried by the cover 79 may generally support the bag 81 in a suitable and convenient position to the rear of the refrigerator and above the false back 77.

Further changes and modifications are also contemplated which will not deviate from the general concept of the invention. However, such changes and deviations shall be governed by the breadth and scope of the appended claims directed to the invention.

What I claim is:

1. A filter mechanism for air conducting means comprising, in combination, an open-ended air duct provided with a branch air discharge opening and a drawer carried within said duct, said drawer comprising a walled chamber having an air inlet opening at one end to receive air from one of the open duct ends and an air outlet portion at the other end of the chamber for communication with said branch air discharge opening in the duct, said chamber being arranged to fit said duct whereby to bypass duct borne air therethrough, and screen filter members carried angularly crosswise of said chamber to clean air passing through said filter members, said filter members alternately terminating short of the opposite sides of said chamber to provide alternate opposite air passageway openings around said screen filter members and to permit tortuous air flow through said chamber when said screen filter members have become overly filled with air borne materials that have been removed from the air, said drawer having one wall portion thereof arranged to close off the other open end of said duct against air discharge, and a handle on said drawer arranged to project outwardly of said other open end of said duct and through said opening for drawer removal for servicing and cleaning or to renew said filter members of said drawer.

2. In a refrigerator having a compartment to house refrigerator mechanisms, in combination, air supply means to cool said mechanisms comprising an air passageway formed within said refrigerator having an exterior air inlet opening and an air outlet opening communicating with said compartment, and an air filter mechanism for said passageway comprising a removable drawer supporting air filter units therein, said drawer having an air receiving opening at one end and an open portion at its other end adapted to communicate with said air outlet passageway opening into said compartment, said drawer being wholly confined within said passageway, said passageway being disposed adjacent the open bottom of the refrigerator and said compartment mechanisms being carried upon a floor defining the upper part of the passageway having the air outlet opening from the passageway formed therethrough and leading into the refrigerator compartment, and said drawer being open at its top and partially covered by said floor, said drawer bottom providing means to close off the open bottom of said refrigerator to cause the cooling air to be directed through said drawer and into said compartment.

3. A filter means for a fluid conveying system for a domestic appliance comprising, in combination, a fluid conveying duct in said appliance providing apertures through opposite walls of said appliance and a lateral opening leading out of said fluid duct into said appliance, and a filter unit consisting of a drawer proportioned to provide a closure wall to completely traverse said fluid duct space closing one face of said drawer, the other face of the drawer being open and arranged to lie adjacent said lateral opening in said fluid duct of the appliance, and a plurality of peripheral walls extending about said closure wall of said drawer, at least two of said peripheral walls being positioned adjacent said apertures in the aforesaid opposite walls of said appliance, one of said two peripheral walls closing the aperture in one of the walls of the appliance and the other of said two peripheral walls having a vent to register with the aperture of the other of said opposite walls in said appliance.

4. In the structure defined in claim 3, with the addition of means to remove said drawer from said fluid conveying duct through one of said apertures in one of the opposite walls of said appliance for cleaning purposes.

5. In the structure defined in claim 3, wherein said lateral opening of said appliance is arranged in a position remotely located with respect to the vent opening in the other of said peripheral drawer walls, and wherein said drawer is provided with filter members to cleanse fluid being conveyed through said drawer.

6. In the structure defined in claim 5, wherein said filter members are transversely arranged within the drawer and in respect to the fluid flow path through the drawer and alternately staggered to provide tortuous open fluid flow spaces about the ends of said members.

7. In a refrigerator, in combination, a base, a compartment to house refrigeration mechanisms, a floor for said compartment to carry said mechanisms spaced upwardly from the lower terminal portion of the supporting base of the refrigerator, said base having spaced wall openings beneath said floor and an opening in the floor providing communication with said compartment, said base providing an air duct passageway, and an air filter mechanism comprising a drawer in said base proportioned to fit the base and being removable through one of said base wall openings, one portion of said drawer closing said one opening with another portion of said drawer having a vent to receive air from the other of said base wall openings, said drawer having other portions thereof coacting with said compartment floor to define an air duct leading to said floor opening, and air filter mechanisms supported within said drawer to cleanse air passing therethrough.

8. In a refrigerator, in combination, a refrigerator cabinet, a duct structure defined by a portion of said refrigerator cabinet, said cabinet having openings in opposite walls thereof forming the two ends of the duct structure and having a floor defining the upper portion of the duct structure, refrigerator mechanisms in said cabinet and above said floor, and said floor having an opening therethrough to provide communication between said duct structure and the refrigerator mechanism space of said cabinet, and a filter mechanism positioned within said duct structure comprising a removable drawer to fit said duct structure and being disposed in the path of the airstream area of said structure, said drawer having spaced open portions with one open portion arranged in one wall of the drawer to receive air through one of the cabinet wall openings and having the other open portion providing a part of the top of the drawer and arranged for communicating with said floor opening to discharge said air therethrough, said drawer having another wall thereof arranged to close the other of said cabinet wall openings, and a plurality of filter screens connected with said drawer intermediate the length thereof and positioned in the path of the air conducted through said drawer to divide out foreign airborne matter from the passing air.

9. In a refrigerator, in combination, a refrigerator cabinet, a duct structure defined by a portion of said refrigerator cabinet, said cabinet having openings in opposite walls thereof forming the two ends of the duct structure and having a floor defining the upper portion of the duct structure, refrigerator mechanisms in said cabinet and above said floor, and said floor having an opening therethrough to provide communication between said duct structure and the refrigerator mechanism space of said cabinet, and a filter mechanism positioned within said duct structure comprising a removable drawer to fit said duct structure and being disposed in the path of the airstream area of said structure, said drawer having spaced open portions with one open portion arranged in one wall of the drawer to receive air through one of the cabinet wall openings and having the other open portion providing a part of the top of the drawer and arranged for communicating with said floor opening to discharge said air therethrough, said drawer having another wall thereof arranged to close the other of said cabinet wall openings, and a plurality of filter screens connected with said drawer intermediate the length thereof and positioned in the path of the air conducted through said drawer to divide out foreign airborne matter from the passing air, said filter screens each being positioned transversely of said drawer and extending to a height adjacent the cabinet floor and terminating short of the full width of said drawer, with said screens being arranged in transverse staggered relation with respect to each other to provide a tortuous open passageway through said drawer and about the lateral free ends of the screens.

References Cited in the file of this patent

UNITED STATES PATENTS

| | | |
|---|---|---|
| 1,716,481 | Bilsky | June 11, 1929 |
| 1,926,433 | Cartmell | Sept. 12, 1933 |
| 2,254,604 | Forsthoefel | Sept. 2, 1941 |
| 2,286,491 | Kucher | June 16, 1942 |
| 2,324,620 | Eberhart | July 20, 1943 |
| 2,483,540 | Henny | Oct. 4, 1949 |
| 2,612,705 | Kauffman | Oct. 7, 1952 |